United States Patent [19]

Reppert

[11] 4,275,931
[45] Jun. 30, 1981

[54] OFFSET WIRE WHEEL
[75] Inventor: Merlyn R. Reppert, Rancho Palos Verdes, Calif.
[73] Assignee: W. R. Grace & Co., Columbia, Md.
[21] Appl. No.: 7,813
[22] Filed: Jan. 30, 1979
[51] Int. Cl.³ .............................................. B60B 1/04
[52] U.S. Cl. ................... 301/37 R; 301/58; 301/97
[58] Field of Search ............... 301/37 R, 37 T, 55–58, 301/67–72, 95–98, 73, 12 R; 29/159.02, 159.1, 159.03

[56] References Cited
U.S. PATENT DOCUMENTS

| 1,488,340 | 3/1924 | Gustafson | 301/55 X |
|---|---|---|---|
| 1,642,207 | 9/1927 | Jones | 301/59 |
| 3,008,770 | 11/1961 | Mueller | 301/58 X |
| 3,891,276 | 6/1975 | Spisak | 301/37 T X |
| 3,993,357 | 11/1976 | Reppert | 301/58 |

FOREIGN PATENT DOCUMENTS

| 1249390 | 11/1960 | France | 301/55 |
|---|---|---|---|
| 514414 | 2/1955 | Italy | 301/58 |
| 368484 | 3/1932 | United Kingdom | 301/58 |

Primary Examiner—Charles A. Marmor
Attorney, Agent, or Firm—Lane, Aitken, Ziems, Kice & Kananen

[57] ABSTRACT

A wire wheel center to be affixed to the drop center of a tubeless tire rim comprising a hub concentrically located within a felly and connected thereto by wire spokes. A plurality of portions of said felly are arranged axially and seriatim, with the axial innermost of said portions being affixed to said rim and the middle and outermost of said portions receiving the outer ends of said spokes.

17 Claims, 13 Drawing Figures

OFFSET WIRE WHEEL

This invention relates to wire wheels and particularly to such a wheel adapted for use with standard tubless tires. The invention wheel center has the so-called "long spoke lip laced look" of traditional European type wire wheels. The center is offset to one side of the drop center of the rim so as to, among other advantages, permit the use of the invention wheel on front wheel drive vehicles.

Modern automobile design is tending towards a more narrow overall body width coupled with wider suspension, more frequent use of front wheel drive, and more complex braking systems, all of which occupy more space transverse of the automobile. The invention accomodates these conflicting forces by providing a relatively large offset to permit more of the braking system, the steering gear and the universal joints in front wheel drive vehicles to, in effect, be located "inside" the back of the wheel rim.

In addition, from the aesthetic view point, it is desirable to provide the so called lip-laced look; i.e., the spokes are relatively long and connect to the rim close to its outermost portion to thereby simulate the so-called traditional European wire wheel look.

Thus, the invention provides wire wheels of the character described which have no spoke holes through the rim to permit use of conventional tubless tires, which simulates the traditional European wire wheel look, and in which the center is offset well outwardly of the rim centerline to accomodate front wheel drive, more complex front suspensions and the like as described above, while at the same time permitting the use of relatively narrower overall vehicle body widths.

The above and other advantages of the invention will be pointed out or will become evident in the following detailed description and claims, and in the accompanying drawings also forming a part of this disclosure, in which:

FIGS. 4, 5 and 6 are views similar to FIGS. 1, 2 and 3 respectively showing a second embodiment, and 7 through 13 are partial cross-sectional views similar to the upper portion of FIG. 2 or FIG. 5 each showing a different felly cross-sectional shape.

Rim 12 is a conventional tubeless tire rim and comprises a bead portion 18, a tire carrier portion 20 and an outer lip 22. These sections 18, 20 and 22 extend to one side of the drop center 16, and this side is the front of the wheel. In the FIG. 2 embodiment, and in the other forms of the invention as necessary, (such as FIGS. 8 and 9) the rim is dimpled as at 21 at the juncture of portions 16 and 18, and a hole 23 is made to receive a tubeless tire filler nozzle in the conventional manner. To the rear of the drop center the rim comprises a width section 24, a second tire bead section 26, the rear tire carrier section 28, and a rear lip 30.

Figure 1:
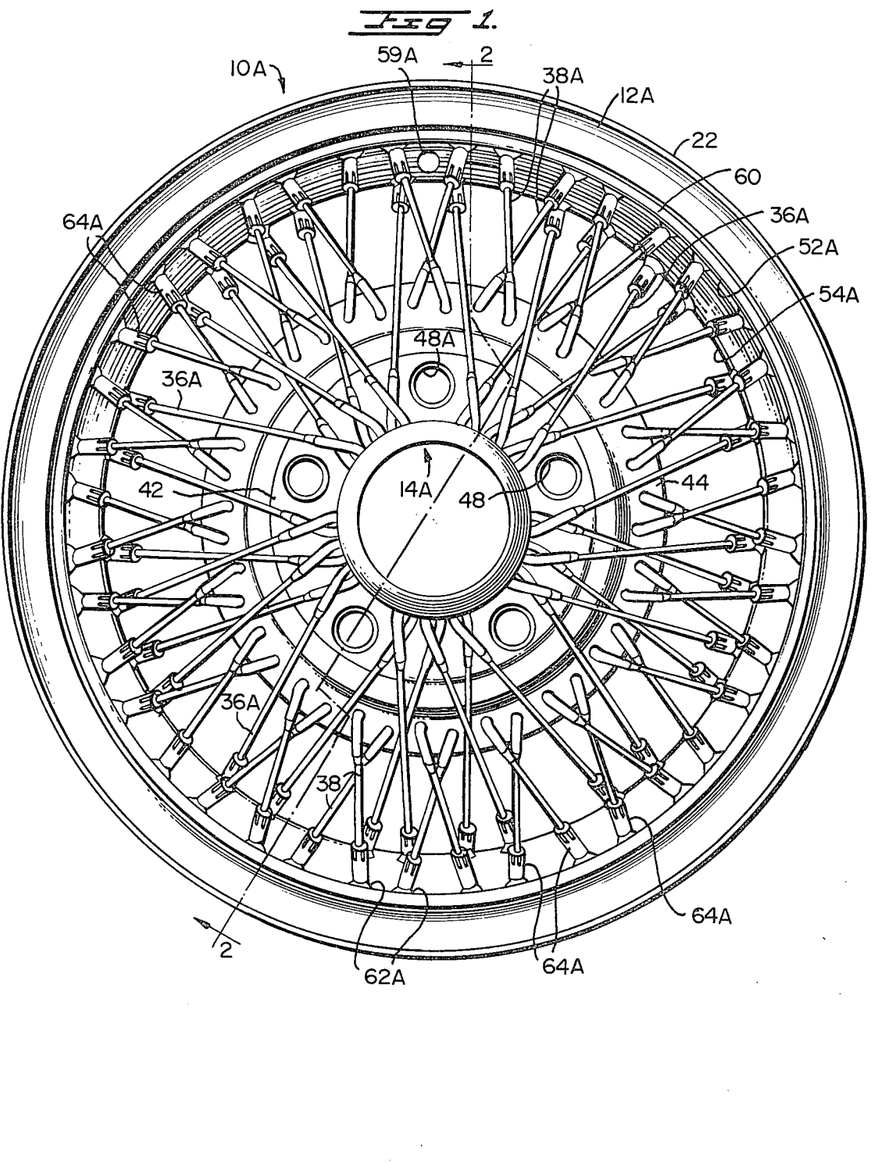
FIG. 1 is a front elevation view of a first embodiment of a wheel according to the invention with parts of the rim broken away.
Figure 2:
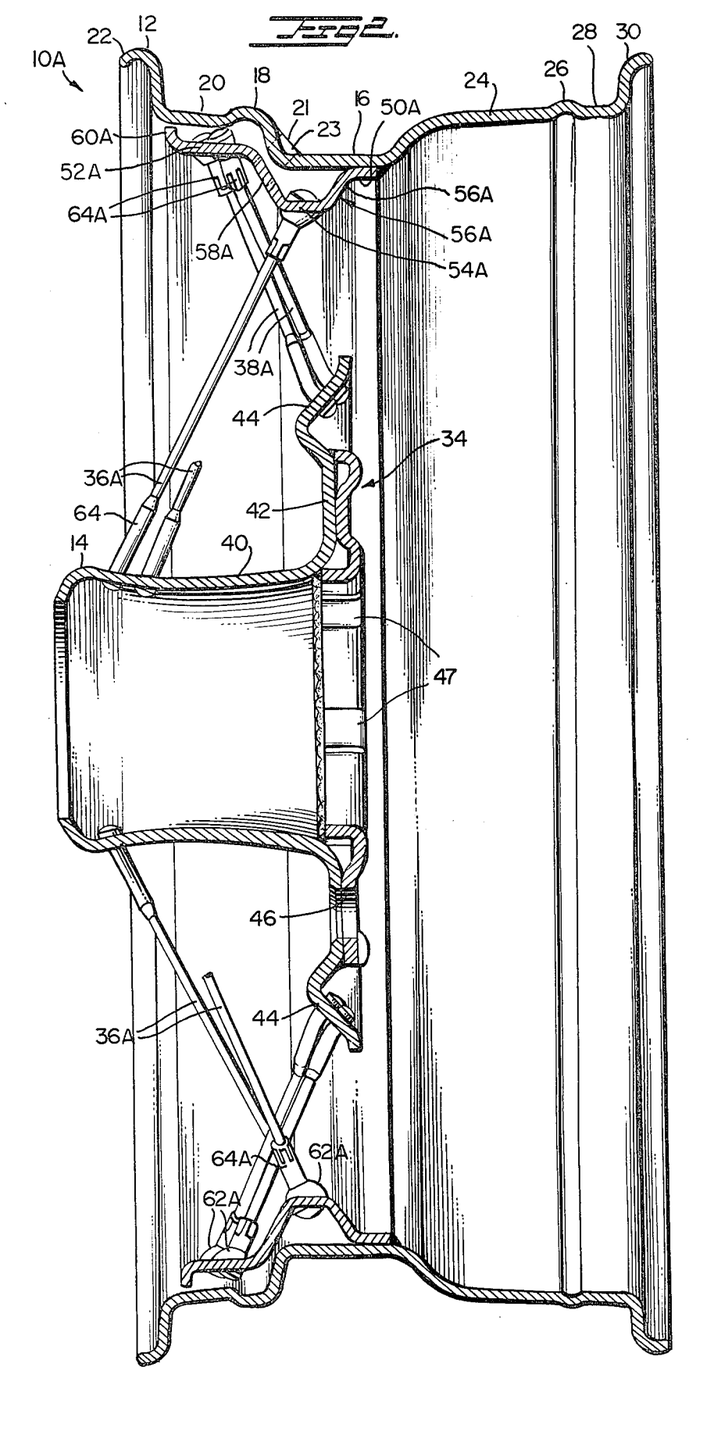
FIG. 2 is a cross-sectional view of the wheel taken on line 2—2 of FIG. 1.

Center 10 comprises an outer felly 32 and a center hub member 34 interconnected by conventional wire spokes and nipples. Two sizes of spokes are used; relatively longer front spokes 36 and relatively shorter rear spokes 38. The spokes are designated front and rear because the longer spokes are more visable to an observer from the front, even though parts of the front spokes are behind parts of the rear spokes. Referring to FIGS. 1 and 2 simultaneously, it can be seen that the front spokes are arranged asymetrically in groups interspersed between the lug bolt holes in the hub, while the rear spokes 38 are arranged symetrically in pairs uniformly all around the hub. Specifically, in the five lug version shown in the drawings, the front spokes are arranged in five groups of six each (30 spokes) and the rear spokes are arranged in 20 pairs (40 spokes), a total of 70 spokes. This relatively large number of spokes is desirable because each spoke can be thinner, thus further enhancing the European or traditional wire wheel look. However, it should be understood that this particular arrangement of spokes, as well as the number of spokes, is exemplative only, the scope of protection being defined by the claims.

The hub assembly comprises a forwardly extending neck portion 40, a generally radially disposed wheel mounting portion 42 and a rear spoke attachment portion 44 formed with suitable spoke holes. A hub cap is usually mounted in the front open end of the neck portion 40. The forward ends of the front long spokes 36 are mounted in openings formed in the front of the neck portion 40. A mounting pad member 46 is fixed to the rear side of the hub portion 42, and a plurality of lug holes 48 are provided through portion 42 and the member 46. Pad 46 is provided with a plurality (five in the embodiments shown) of more or less conventional lobes 47 which are sometimes used to aid in mounting the wheel on a vehicle.

Felly 32 is an important element of the present invention. Referring to FIG. 2 at the top, felly 32 comprises a rear generally axial flange 50A, a front generally axial flange 52A and a middle generally axial flange 54A. A flange portion 58A disposed radially inwardly and rearwardly interconnects the flange portions 54A and 52A; and a flange portion 56A disposed radially inwardly and forwardly interconnects the flange portions 50A and 54A. An air filler nozzle clearance opening is provided in flange portion 58A. Finally, a radial front flange 60A is disposed at the front end of the front axial flange 52A and extends radially outwardly thereof. The radial outer ends of the spokes 36 and 38 are carried in flanges 52A and 54A. For this purpose, these flanges are dimpled and pierced as at 62A to receive the spoke nipples 64A. In FIG. 2 the view is through the felly in regions thereof not disturbed by the dimples 62A and therefore the dimples show in elevation. That is, FIG. 2 shows the cross-sectional shape of the felly (cross-hatched) without the distortions caused therein by the dimpling and piercing. However, the complete cross-sectional shape is easily imagined by the showing of the dimples in elevation behind (into the paper) the otherwise undisturbed felly cross-sectional shape.

The invention is not limited to attaching the innermost flange section 50 of the felly to the drop center 16 of the rim. The invention center could be attached to other portions of the rim. For example, if it were desired to reverse the wheel from the FIG. 2 configuration, felly portion 50 could be attached to rim section 24, the front of the wheel then being to the right as shown in FIG. 2 rather than to the left, see FIGS. 11, 12 and 13. Of course, in such case, the configuration of the felly would be adjusted suitably to accomodate its location with respect to the rim as well as to the vehicle front end gear.

The offset of the wheel is determined by the position of the mounting pad 46 with respect to the radial center plane of the rim. The wheel offset then is in turn controlled by the position at which the rear axial flange 50 is welded to the drop center 16. All of the spokes 36 and 38 are located forwardly of this flange 50, thus further enhancing the offset. The front flange 60 is turned radially outwardly so as to give the appearance of the finished wheel merging with the outer lip 22 of the rim. The spokes cross each other front to back of the wheel. Thus, the invention achieves the so-called European lip-laced look.

Figure 3:
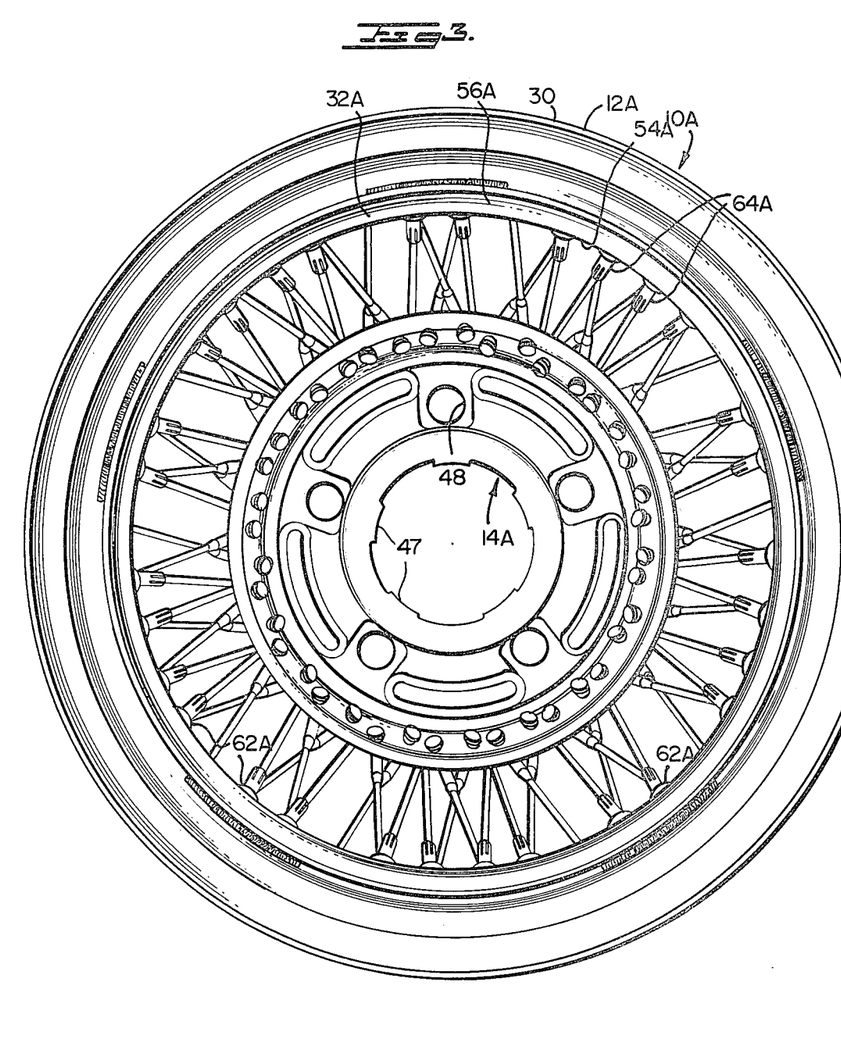
FIG. 3 is a rear elevational view similar to FIG. 1.
Figure 7:
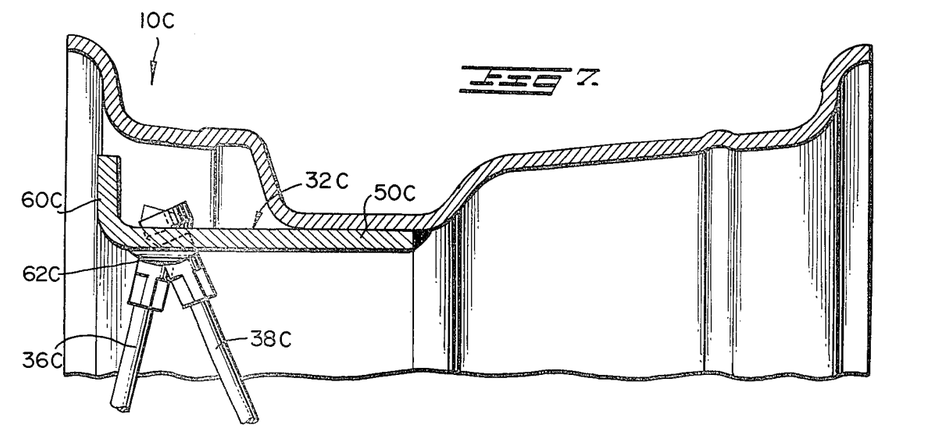
Figure 9:
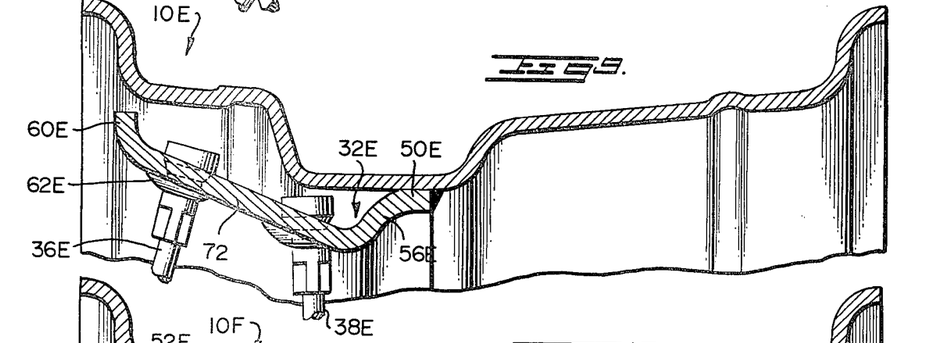
Figure 10:
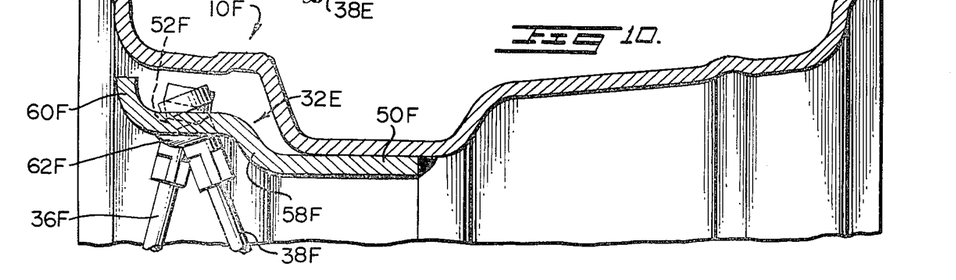

This first embodiment of FIGS. 1, 2 and 3 is amenable to a spoke arrangement without the front to rear crossing as shown, see FIGS. 7, 9 and 10 for similar such arrangements. In such case the long front spokes 36 would connect to the dimples 62, and the shorter rear spokes 38 would connect to the surface 54. The invention will still achieve the long lip-laced look although the spokes would not cross. This would, esthetically, be a minor variation of the pure traditional European lip-laced look.

Figure 4:
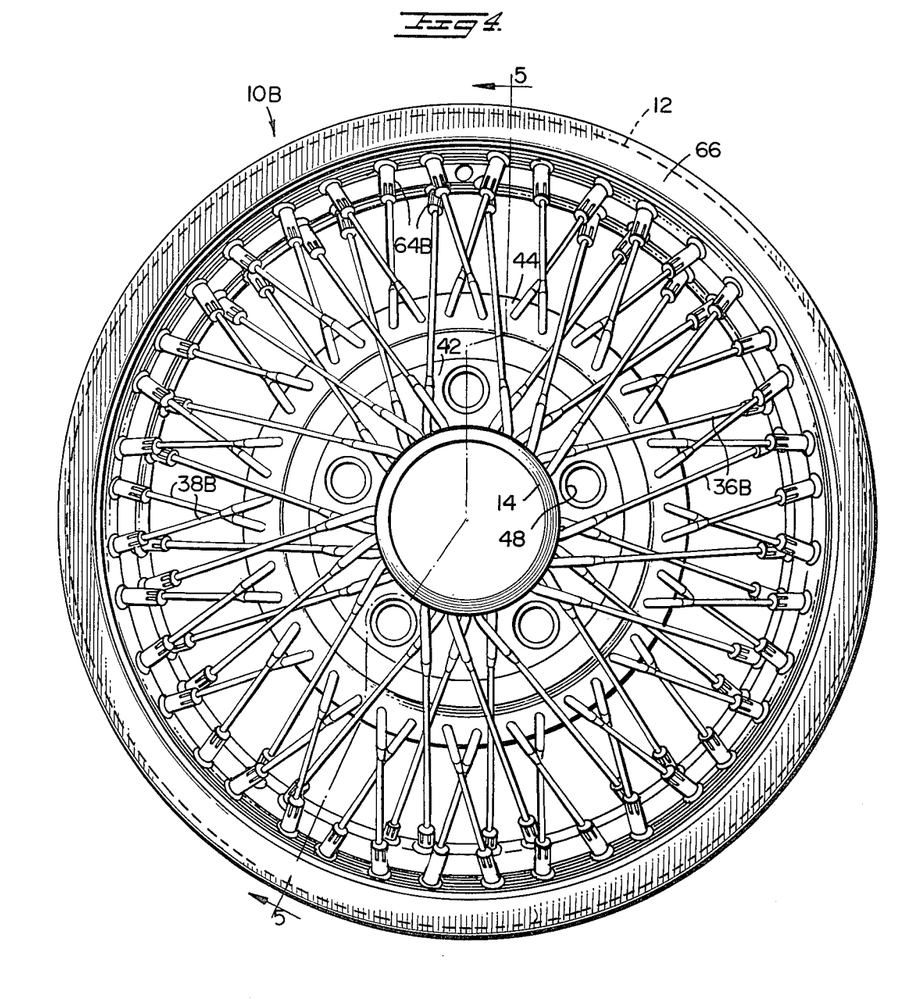

Referring now to FIGS. 4, 5 and 6, there is shown a second embodiment 10B of a wheel embodying the invention. Parts the same as or similar to those described above in wheel 10A carry the same reference numeral followed by "B".

Figure 13:
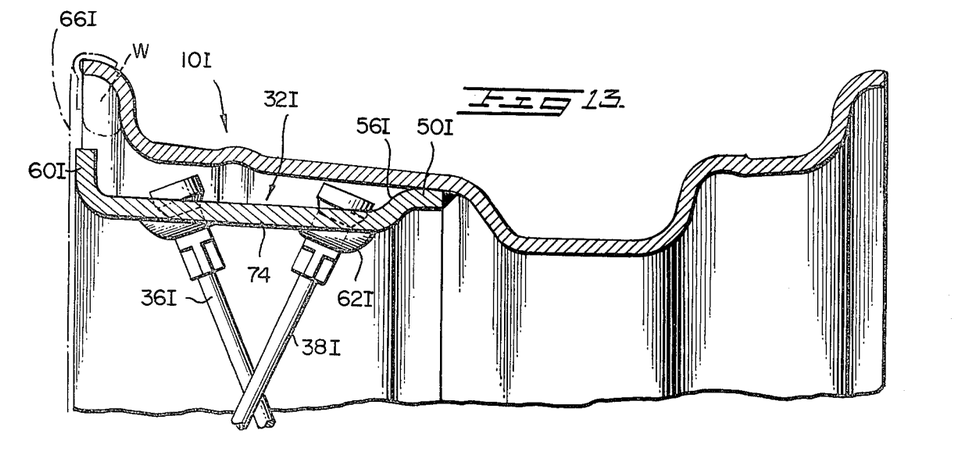

The primary difference between the wheels 10A and 10B is the amount of offset and a slightly differently configured felly 32B. Note that the rear flange 50B is joined to the drop center 16 at the outermost end thereof, whereas the rear flange 50 of the first embodiment is set back considerably further on its drop center. Accordingly, the wheel 10B uses different length spokes at different angles than those in the first embodiment, and the felly sections are shaped slightly differently. Specifically, the two sloped sections 58B and 56B are slightly shorter than their wheel 10 counterparts, and the angles at which the sections join each other are slightly different. Finally, the outer lip or front flange 60B is positioned away from the outer lip 22 of the rim. For this reason, an optional trim ring 66 is provided, it snaps onto the flange 60B in a manner analogous to hub cap attachment to close the gap and to conceal the wheel balancing weights, which might otherwise be deemed undesirable in appearance. FIG. 13 shows, somewhat diagramatically, how a wheel weight W might be covered by a trim ring 66I. Alternatively, the trim ring 66 could be arranged to snap onto the radial inside of the rim outer flange 22.

It is thought that the invention achieves its strength despite the fact that the entire spoke carrying sections of the felly are located outward of the attachment of the felly to the rim for the reason that the attachment causes the rear portion of the rim 24 and portions to the right thereof in FIG. 2 to act as if these portions of the rim were a continuation of the entire felly. Thus, functionally, after the center is attached to the rim, the rear section of the rim together with the felly act functionally as if they were one continuous tube to thereby produce the strength, the spokes being laced to the outer end of this relatively much longer tube.

Thus, the invention felly can be thought of as being cantilevered. That is, one end of the felly is joined to the drop center at a position thereon determined by the amount of offset required for a particular wheel, but the remainder of the felly, and hence the remainder of the wheel center, is entirely to one side of the point at which the felly is joined to the rim.

In both embodiments the spokes 64 being threaded and rotatable in the pierced dimples 62 permits tuning of the spokes as well as replacement of a broken spoke in the conventional manner.

Invention wire wheel centers can be manufactured in accordance with the processes set forth in my prior U.S. Pat. No. 3,993,357, minor process changes for the shape of the felly being easily accomplished by those skilled in these arts.

Figure 11:
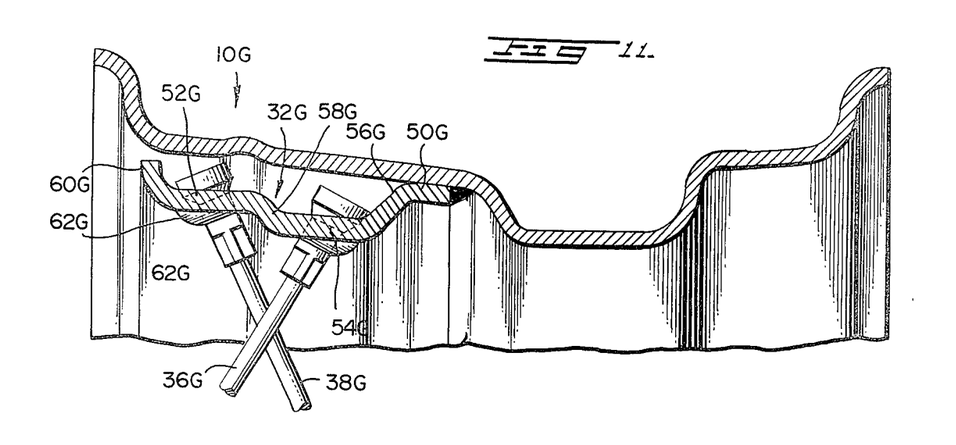
Figure 12:
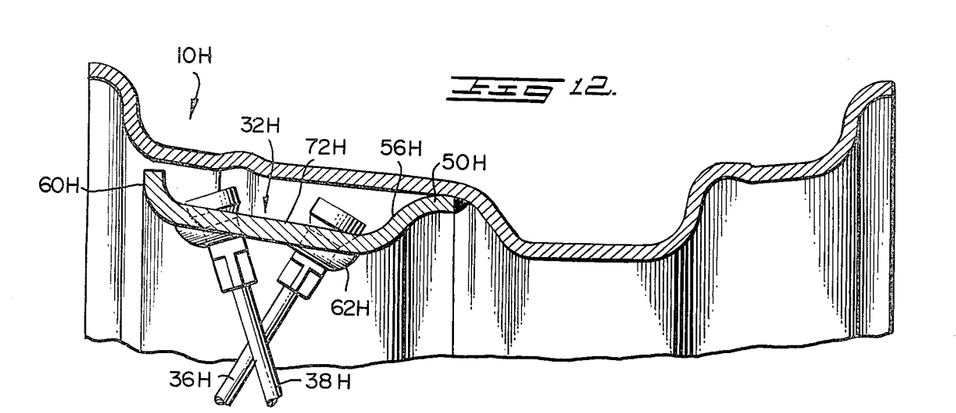

Referring now to FIGS. 7 through 13, there are shown seven additional embodiments 10C through 10I. The first four embodiments in FIGS. 7, 8, 9 and 10 are so-called "shallow" set designs, and the remaining three forms in FIGS. 11, 12 and 13 are reversed or so-called "deep" set. In all cases the same standard tubless tire rim is used.

In FIG. 7 embodiment 10C comprises a felly 32C of generally elongated "L" shaped cross-sectional configuration comprising a front flange 60C and an elongated axially disposed flange 50C. The front and rear spokes do not cross.

Figure 8:
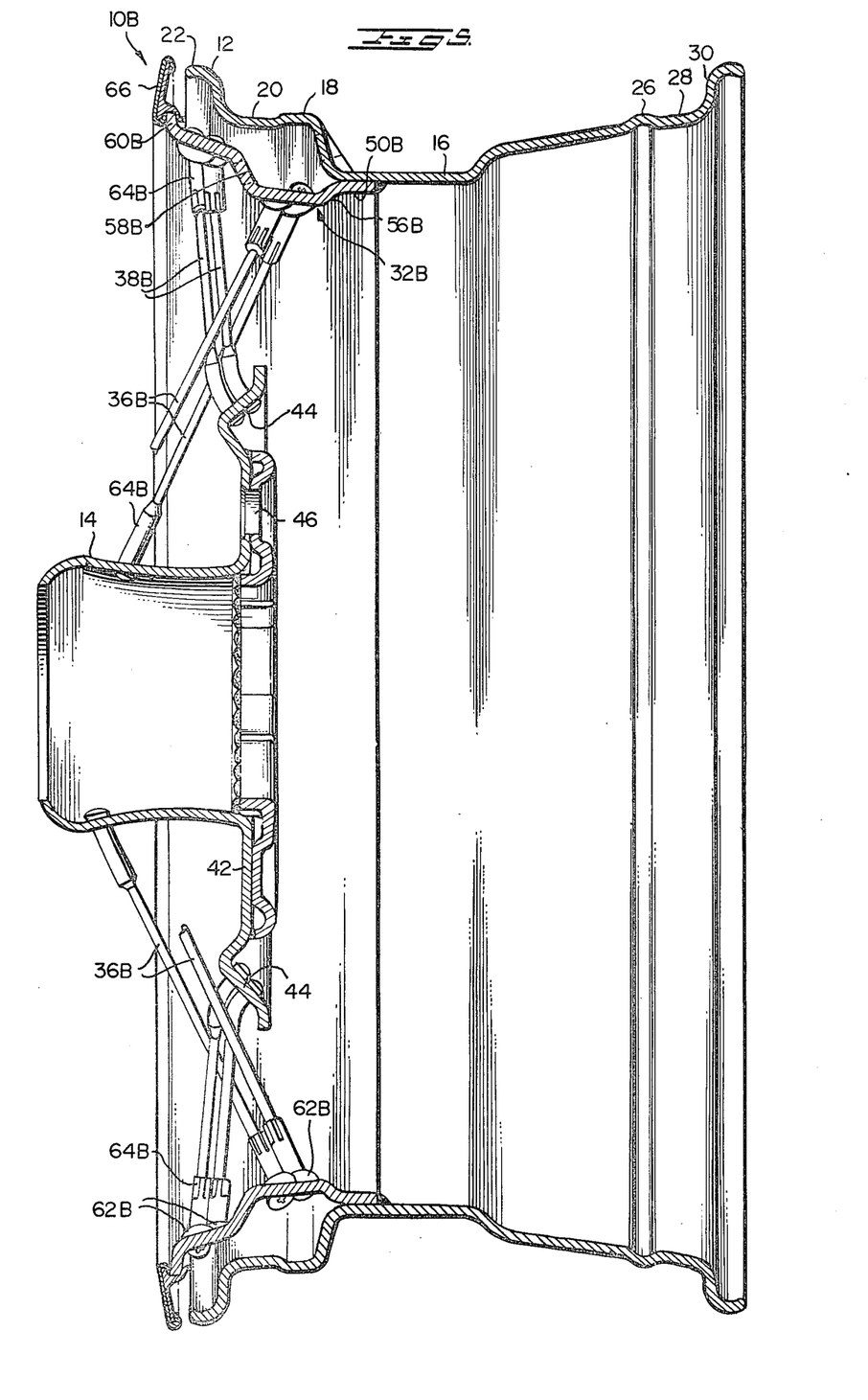

The 10D form of FIG. 8 comprises a relatively elongated flange portion 68 provided with inwardly extending enlarged dimples or flattened places 70, as opposed to the outwardly extending dimples 62 of the other embodiments. The dimples 70 permit the front to rear crossing of the spokes 38D and 36D in a felly having a generally forwardly and radially outwardly sloping configuration.

In FIG. 9 the 10E version is similar to the FIG. 8 version, with the exception that the spokes do not cross front to rear, and they have their radial outer ends spaced relatively far apart, as shown.

The 10F version of FIG. 10 comprises a generally axially disposed flange 52F and an enlongated attachment flange 50F, with a single step portion 58F.

The remaining three forms are reversed or deep set versions, all three of these fellys being elongated front to rear to accommodate deep setting.

The FIG. 11 the 10G version is very similar to the 10A and 10B versions, the two intermediate sloped sections 56G and 58G being shortened in proportion to the axial sections 54G and 52G. This 10G version as well as the 10H and 10I versions described below, is attached to the rim forwardly of the drop center portion thereof, in order to accomodate the deep setting of the wire wheel center in the rim.

The FIG. 12 version is analogous to the FIG. 9 version modified for deep setting, similar parts being indicated by reference numeral H, including the main generally axial flange 72H.

Finally, the 10I version in FIG. 13 is analogous to the FIG. 7 version, with the addition of the slight offset at the rear end 56I to permit clearance of the spoke dimples and heads at the radial outside of the felly between the felly and the rim. A trim ring analogous to the part 66 described above may also be provided.

The invention permits the use of conventional balancing techniques in all embodiments. The rim front and rear lips are available to carry balancing weights in the conventional manner with, of course, removal of any trim ring 66 as needed. The trim ring spring clip type mounting makes such removal and remounting easy.

While the invention has been described in detail above, it is to be understood that this detailed description is by way of example only and the protection granted is to be limited only within the spirit of the invention and the scope of the following claims.

I claim:

1. A weight bearing wire wheel center for use with and adapted to be affixed to the drop center portion of a tubless tire rim, said wheel center comprising a hub concentrically located within a felly and connected thereto by spokes, said felly comprising a closed circular member in planes perpendicular to the wheel center axis, the improvement comprising a plurality of portions of said felly arranged generally axially and axially seriatim, the axial innermost of said portions being adapted to be affixed to said rim, and a middle and outermost of said portions receiving the outer ends of said spokes.

2. The combination of claim 1, a tubeless tire rim, and means to affix said innermost axial portion to the drop center of said rim.

3. The combination of claim 1, wherein said plurality of felly portions comprise three generally axially disposed portions.

4. The combination of claim 3, the middle and outermost ones of said three felly portions being located at different radial distances from the center axis, whereby said center substantially replicates the juxtapositioned rim profile to thereby simulate a lip-laced wire wheel.

5. The combination of claim 3, wherein the outermost felly portion is connected by relatively short spokes to a rear portion of said hub and the middle felly portion is connected by relatively longer spokes to said forward portion of said hub, and said longer and shorter spokes cross each other in planes radial of said wheel and perpendicular to the axis of said center.

6. The combination of claim 3, said spokes having threaded ends, the outermost and middle ones of said three felly portions being pierced and dimpled, and threaded spoke nipples located in said pierced dimples for cooperation with the outer ends of said threaded spokes.

7. The combination of claim 3, the middle and outermost ones of said three felly portions being located at different radial distances from the axis of said wire wheel center.

8. The combination of claim 7, said outermost felly portion being located radially further from the wheel center axis than said first portion, whereby said middle and outermost portions produce a wheel center appearance similar to the appearance of a lip-laced wire wheel.

9. The combination of claim 1, and a trim ring, means to removably attach said trim ring to the felly outermost portion, whereby any space between said felly outermost portion and a rim when said center is affixed to said rim is concealed by said trim ring.

10. A weight bearing wire spoke wheel center structure separate from and adapted to be mounted in a tubless tire rim, the combination comprising a felly, said felly comprising a closed circular member in planes perpendicular to the wheel center axis, a hub concentrically located within said felly, said felly comprising means adapted to be affixed to said tubeless tire rim, said felly comprising a first portion and a second portion, said first and second portions of said felly being located at different radial distances from the axis of said wire wheel center, and a plurality of spokes interconnecting said first and second portions of said felly with said hub.

11. The combination of claim 10, said first and second portions of said felly being generally axially disposed.

12. The combination of claim 10, said second felly portion being located radially further from the wheel center axis than said first portion, whereby said first and second portions produce a wheel center appearance similar to the appearance of a lip-laced wire wheel.

13. The combination of claim 10, wherein said second portion of said felly is connected by relatively shorter ones of said plurality of spokes to a rear portion of said hub and said first portion is connected by relatively longer ones of said plurality of spokes to an axially front portion of said hub, and said longer and shorter spokes cross each other in planes perpendicular to the axis of center.

14. The combination of claim 10, said spokes having threaded ends, said first and second portions of said felly being pierced and dimpled, and threaded spokes nipples located in said pierced dimples for cooperation with the outer ends of said threaded spokes.

15. A wire wheel comprising the wire spoke wheel center of claim 10 and a tubeless tire rim, and means to affix said felly to said rim.

16. The combination of claim 15, said first and second felly portions being so shaped and so located that they substantially replicate the appearance of said rim forwardly of the location of the felly's attachment to said rim, whereby said wheel simulates the so-called lip-laced look.

17. The combination of claim 15, a trim ring, and means to removably connect said trim ring between said rim and said second felly portion.

* * * * *